United States Patent
Bernal Bernal et al.

(10) Patent No.: US 11,043,150 B2
(45) Date of Patent: Jun. 22, 2021

(54) SELF-SUPPORTING SYSTEM AND A METHOD FOR THE MASS COMMUNICATION AND DISTRIBUTION OF CONTENT AND DIGITAL ADVERTISING IN PUBLIC SPACES

(71) Applicant: Ricardo Adolfo Bernal Bernal, Popayan (CO)

(72) Inventors: Ricardo Adolfo Bernal Bernal, Popayan (CO); Alejandro Ignacio Moncayo Cobo, Popayan (CO); Julian David Medina Mosquera, Popayan (CO); Gabriel Eduardo Rengifo Rios, Popayan (CO)

(73) Assignee: Ricardo Adolfo Bernal Bernal, Popayan (CO)

( * ) Notice: Subject to any disclaimer, the term of this patent is extended or adjusted under 35 U.S.C. 154(b) by 0 days.

(21) Appl. No.: 16/616,554

(22) PCT Filed: Jun. 8, 2018

(86) PCT No.: PCT/IB2018/054133
§ 371 (c)(1),
(2) Date: Nov. 25, 2019

(87) PCT Pub. No.: WO2018/225017
PCT Pub. Date: Dec. 13, 2018

(65) Prior Publication Data
US 2020/0082744 A1 Mar. 12, 2020

(30) Foreign Application Priority Data
Jun. 8, 2017 (CO) .................. NC2017/0005722

(51) Int. Cl.
*G09F 19/18* (2006.01)
*G09F 19/22* (2006.01)
*G06F 3/14* (2006.01)
*H04N 9/31* (2006.01)
*G03B 21/14* (2006.01)

(52) U.S. Cl.
CPC ........... *G09F 19/18* (2013.01); *G03B 21/142* (2013.01); *G03B 21/147* (2013.01); *G06F 3/14* (2013.01); *G09F 19/22* (2013.01); *H04N 9/3194* (2013.01)

(58) Field of Classification Search
CPC ...... G03B 21/145; G03B 21/10; G03B 21/14; G03B 21/132; G03B 21/16; G03B 21/00;
(Continued)

(56) References Cited

U.S. PATENT DOCUMENTS

| 4,565,430 A | * | 1/1986 | Grunwald | ............ G03B 21/132 353/119 |
| 5,096,151 A | * | 3/1992 | Shemitz | ............. F16M 11/2071 248/285.1 |
| 5,570,138 A | | 10/1996 | Baron | |
| 6,179,426 B1 | * | 1/2001 | Rodriguez, Jr. | ......... H04N 5/74 353/69 |

(Continued)

FOREIGN PATENT DOCUMENTS

| CN | 104061544 B | 10/2016 |
| WO | 2012005438 A2 | 1/2012 |
| WO | 2014137613 A1 | 9/2014 |

*Primary Examiner* — Dong Hui Liang
(74) *Attorney, Agent, or Firm* — The Morales Law Firm; Joseph L. Morales

(57) ABSTRACT

A self-supporting system for the mass communication and distribution of content and digital advertising in public spaces. The system has a mechanical structure that sets the system on a building and supports the other components. The system has a control module; a connectivity module; a sensor module; one or more human-machine interfaces; and an energy source. A method for the administration, management, and supervision of the system remotely by an administrator, and a method for receiving user inputs with the (Continued)

system. The system allows the use of pre-existing urban infrastructure for communication and mass distribution of content and digital advertising in public spaces with high capacity for attracting the attention of, and interacting with, the public, without need to install intrusive structures within the urban environment, with a low cost and reduced environmental impact.

20 Claims, 6 Drawing Sheets

(58) Field of Classification Search
CPC ........ G03B 21/20; G03B 29/00; G03B 37/04; G03B 31/06; G03B 17/00; G03B 17/425; G03B 17/08; G03B 17/54; G09G 3/002; G09F 15/01012; G09F 15/00; G09F 15/0056; G09F 15/02; G09F 15/005; G09F 19/18; G09F 19/22; G09F 3/204; G09F 27/00; G09F 11/02; G09F 11/12; G09F 7/20

See application file for complete search history.

(56) References Cited

U.S. PATENT DOCUMENTS

| | | | |
|---|---|---|---|
| 2002/0131024 A1* | 9/2002 | Keenan | F16M 11/048 353/79 |
| 2003/0006911 A1* | 1/2003 | Smith | G08G 1/20 340/988 |
| 2004/0165389 A1 | 8/2004 | Chang et al. | |
| 2007/0258016 A1* | 11/2007 | Galligan | G09F 19/18 348/744 |
| 2010/0099396 A1* | 4/2010 | Huq | H04L 67/04 455/420 |
| 2010/0321646 A1* | 12/2010 | Nakano | G03B 21/14 353/119 |
| 2011/0211173 A1* | 9/2011 | Hagino | G03B 21/20 353/61 |
| 2012/0081617 A1* | 4/2012 | Cho | H04N 9/3144 348/748 |
| 2012/0224311 A1 | 9/2012 | Sutherland et al. | |
| 2013/0294039 A1* | 11/2013 | Chao | G06F 1/182 361/752 |
| 2014/0067498 A1* | 3/2014 | De | G06Q 30/02 705/14.16 |

* cited by examiner

SELF-SUPPORTING SYSTEM AND A METHOD FOR THE MASS COMMUNICATION AND DISTRIBUTION OF CONTENT AND DIGITAL ADVERTISING IN PUBLIC SPACES

TECHNOLOGICAL SECTOR

The present invention is within the field of engineering and advertising, related to street furniture for smart cities, specifically with rendering devices that use static media to present variable information. The invention consists of a self-supporting system and a method for mass communication and distribution of content and digital advertising in public spaces.

BACKGROUND OF THE INVENTION

There are various systems in the market to project advertising images on a display surface, such as advertising posters. One example is U.S. Pat. No. 5,570,138, which discloses a projected advertising system having a retractable projection screen that is implemented on a standard fixed poster. The still image of the billboard is displayed during the day. During the night, the projection screen is automatically unrolled in front of the fixed image of the billboard and the projector placed in front of the screen projects advertising images on it. The system can be controlled by photoelectric light sensors or controlled remotely through radio wave signals. However, this system requires the use of public space, since the projection is done in the place used by conventional posters, which are rolled up to allow the projection of advertising content.

Advertisement through the projection of advertising images has several advantages. On one side, the image can be easily changed by simply changing the projected image instead of having to physically replace the conventional static ad adhered to the advertising surface (like a billboard, poster, etc.). In addition, moving video images with no constraints in color combination can be displayed, as well as text, still images or combinations of both; while a still image screen can display one of several images (e.g., by rotating panels or rolling a screen).

Other options to avoid the physical replacement of static ads in advertising systems correspond to advertising through video on screens, such as LED screens, LCD screens or plasma television screens. However, this type of technology is very expensive per unit area, so the investment is very high when trying to cover the same space of a conventional billboard or advertising poster. Likewise, the digital projection of advertising images has multiple advantages. An image projected by a relatively small device can be amplified by means of the layout of various lenses; it can be done at a reduced cost compared to the use of LED, LCD or television screens, and on surfaces such as walls of buildings without involving the installation of billboards or the assembly of a screen. However, there are challenges related to the protection of the projection unit, as well as its location.

For this reason, the use of buildings adjacent to the building where the image will be projected has been proposed in order to protect the projector from environmental conditions and allow the repair and administration of the projector if required. Therefore, this type of advertising system requires a person to remain in the place of projection to ensure that the projection is made, as well as to repair any defect thereof.

Additionally, the existing advertising systems are limited to the fixation or projection of the advertising message, without allowing for interaction of the advertising message recipient with the advertising content.

Therefore, there is a need for a self-supporting system and a method for mass communication and distribution of content and digital advertising that allows the so efficient digital projection of contents and advertising on the walls of existing buildings, without the need to use adjacent facilities, without requiring a person who is constantly at the projection place and also allows for interaction of the advertising message recipient with the advertising content, as well as overcoming the deficiencies and disadvantages of the systems and methods outlined above, particularly in the face of economic costs and efficiency in energy consumption.

BRIEF DESCRIPTION OF THE INVENTION

The present invention is related to a self-supporting system and a method for mass communication and distribution of contents and digital advertising in public spaces that provides automated and self-regulated digital protection advertising that supports, adapts or modifies the projection according to environmental conditions, allows the administration, operation and remote monitoring in real time of advertising projected on pre-existing and underutilized or unused structures, with no need to use adjacent or additional buildings, and allows for interaction of the user receiving the advertising message with the advertising content, increasing the impact of the advertising message on the consumer, with a low urban and environmental impact, mainly by minimizing visual pollution and optimizing energy consumption.

The self-supporting system for mass communication and distribution of content and digital advertising according to the invention is composed of:

a mechanical structure (1) that has a robotic arm (2) that locates the self-supporting system to the building and supports the other system components; a protective case (3) attached to the distal part of the robotic arm (2); and a cooling system (20) that is housed between the protective case (3) and the robotic arm (2);

an image projection system (18);

a mechanical structure (1) that has a robotic arm (2) that locates the self-supporting system to the building and supports the other system components; a protective case (3) attached to the distal part of the robotic arm (2); and a cooling system (20) that is housed between the protective case (3) and the robotic arm (2);

an image projection system (18);

video cameras (19);

a control system (10) composed of a peripheral control module (14) and a connectivity module (12); where the control system (10) is responsible for the analysis of the signals coming from the peripheral control module (14); of receiving the instructions of the human-machine interface (22) (24); of the execution of the data processing method; of the handling of the communications module (11); and the preparation of statistics related to the information handled by the system, among others;

a sensors module (13);

a communications module (11) that allows the connection of the system according to the invention with the mobile telephony network and with the internet network, which allows the administrator (22) the interaction, control and remote administration in real time of the self-supporting so system for mass communication and distribution of content and digital advertising in public spaces according to the invention. Additionally, it periodically reports the administrator user (22) on the normal operating status of the self-supporting system according to the invention or, failing that, it provides real time alerts on abnormalities and the type of failure that is occurring;

one or more human-machine interfaces of the administrator (22);

one or more human-machine interfaces of the user receiving the advertising message (24); and a source of energy, which supplies alternating electrical power to all the components of the self-supporting system for mass communication and distribution of content and digital advertising according to the invention, with autonomy of at least seventy-two hours.

Where the building that supports the self-supporting system for mass communication and distribution of content and digital advertising in public spaces includes the projection surface.

In addition, the invention relates to a method of data processing for mass communication and distribution of content and digital advertising that allows for the administration, management and supervision of the system, remotely and in real time by an administrator user; and a method of data processing for the interaction of the user receiving the advertising message with the self-supporting system for mass communication and distribution of content and digital advertising in public spaces according to the invention.

DETAILED DESCRIPTION OF THE INVENTION

Figure 1:
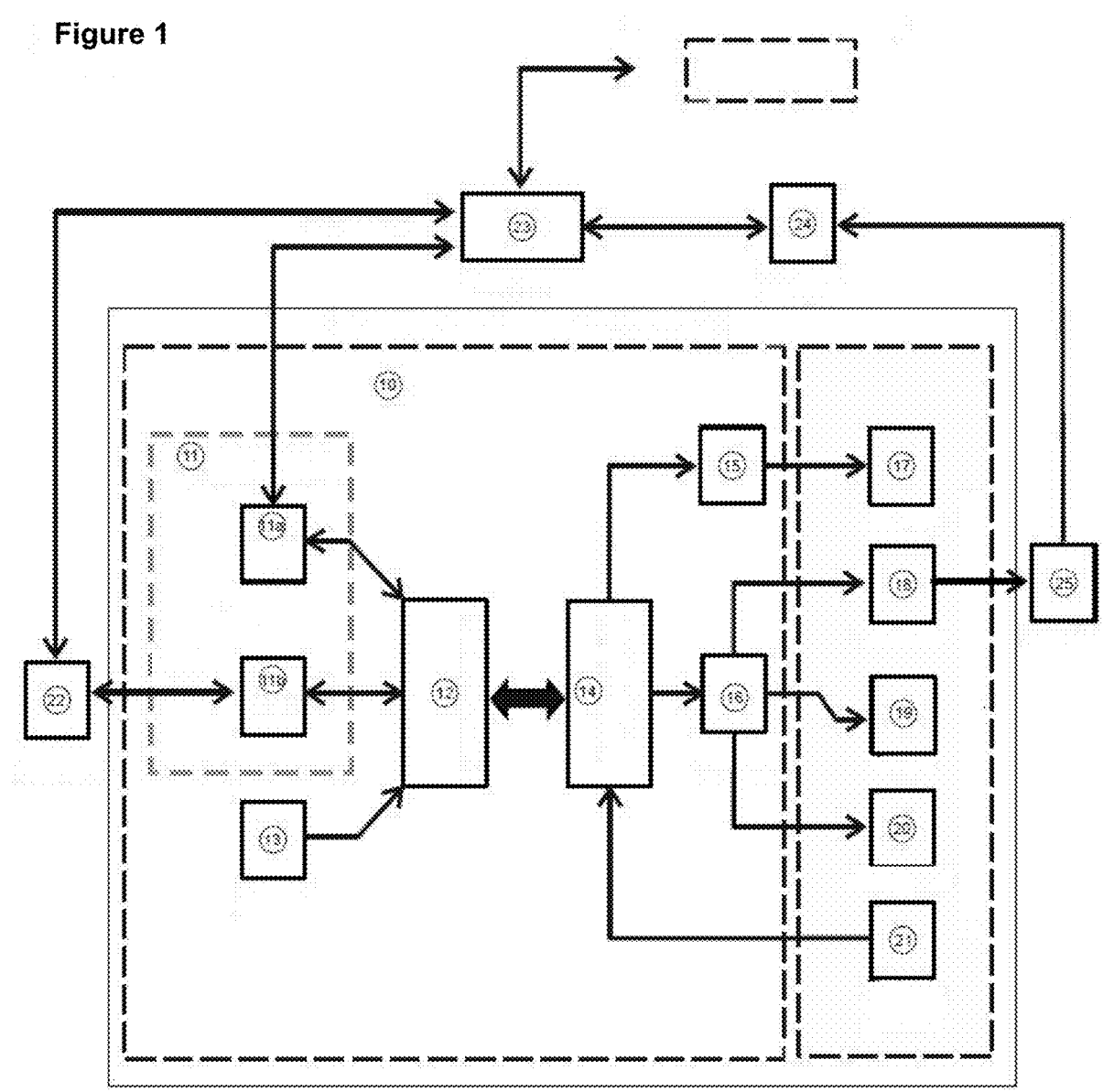
FIG. 1 shows a schematic diagram relating the connection between the different components of the invention.
Figure 2:
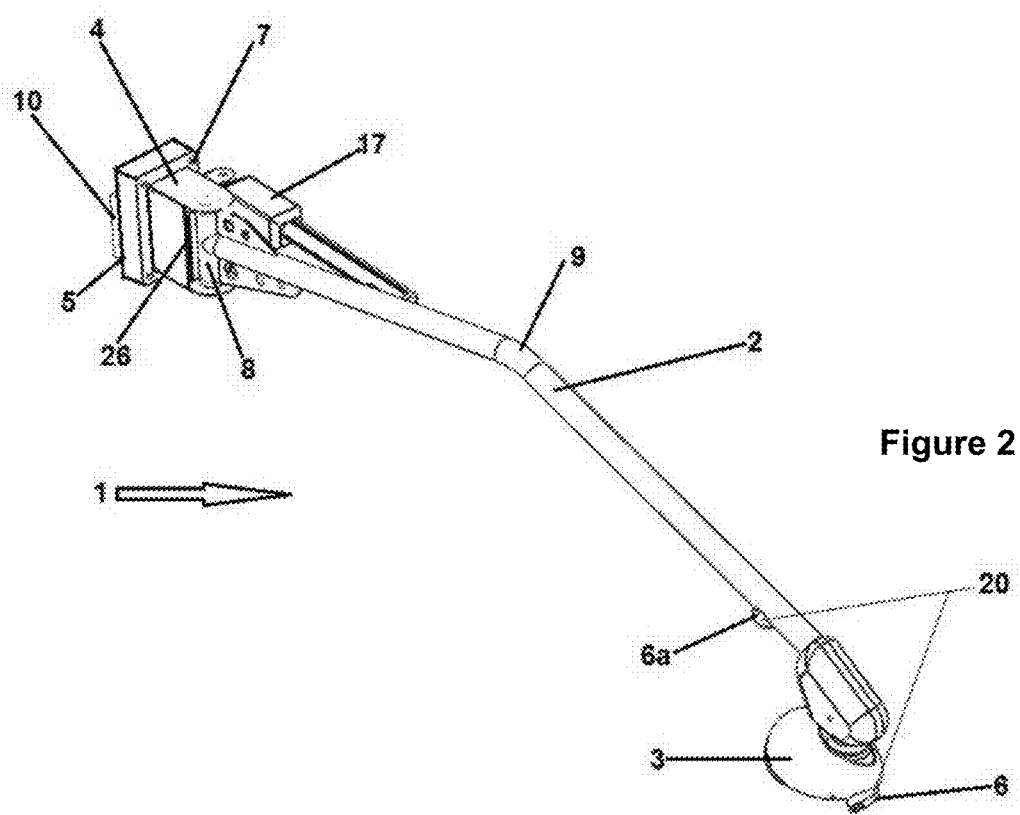
FIG. 2 represents the mechanical structure (1) of the system for mass communication and distribution of content and digital advertising according to the invention.

The present invention is related to a self-supporting system for mass communication and distribution of content and digital advertising in public spaces, as illustrated in FIG. 1 and FIG. 2, which is composed by:

a mechanical structure (1) containing a robotic arm (2) with one or more joints that locates the self-supporting system upon the building and supports all other components of the system; a protective case (3) attached to the distal part of the robotic arm (2); and a cooling system that is housed between the protective case (3) and the robotic arm (2);

a control system (10) comprising a peripheral control module (14) and a connectivity module (12); where the control system (10) is responsible for the analysis of the signals coming from the peripheral control module (14); of receiving the instructions of the human-machine interfaces (22) (24); of the execution of the data processing method; of the handling of the communications module (11); and the preparation of statistics related to the information managed by the system;

a sensors module (13);

a communications module (11) that allows the connection of the system according to the invention with the mobile telephone network and with the internet network; also, it allows the administrator (22) the interaction, control and remote administration in real time of the self-supporting system for mass communication and distribution of content and digital advertising in public spaces according to the invention; additionally, it periodically reports the administrator user about the normal operating status of the self-supporting system according to the invention or, failing that, it provides real time alerts about abnormalities and the type of fault that is occurring;

one or more human-machine interfaces of the administrator user (22);

one or more human-machine interfaces of the user receiving the advertising message (24); and an energy source, which supplies electrical power to all the components of the self-supporting system for mass communication and distribution of content and digital advertising according to the invention, with autonomy of at least seventy-two hours.

Where the building that supports the self-supporting system for mass communication and distribution of content and digital advertising in public spaces includes the projection surface.

The materials of the mechanical structure (1) are those that allow the support of all the components of the self-supporting system for mass communication and distribution of content and digital advertising according to the invention; likewise, it is resistant to extreme environmental conditions and weatherproof. Likewise, the mechanical structure (1) adapts to any surface of the pre-existing building upon which it will be located.

In one modality of the invention, the mechanical structure (1) is located in the pre-existing structure or building by means of anchors (4), rear anchoring supports (5) and fastening elements (7). The anchors (4) allow the clamping between the projection surface, and the robotic arm (2). The rear anchoring supports (5) are selected from metal plates with or without lining and allow the anchorage to be fastened to the pre-existing building. Fastening elements (7) are preferably selected from gripping screws and allow the fastening between the anchor (4) and the rear anchor support (5).

In one modality of the invention, the mechanical structure (1) is located upon a wall of a pre-existing building.

In one modality of the invention, the mechanical structure (1) is in a cantilever of a pre-existing building.

In one modality of the invention, the mechanical structure (1) is placed on the roof, cover or roof tile of a pre-existing building.

Figure 3:
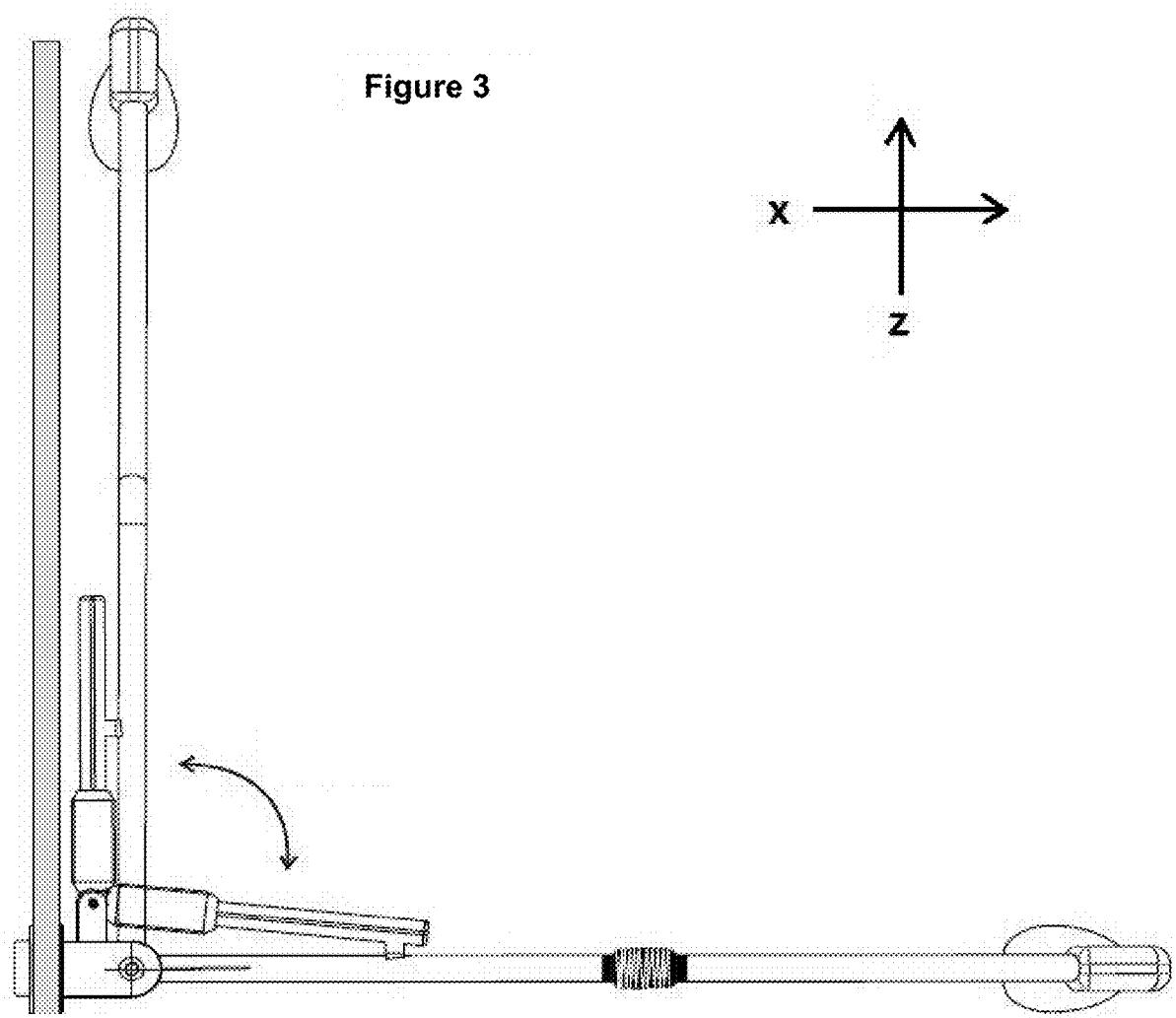
FIG. 3 shows the movement in the x, z plane of the robotic arm (2).
Figure 4:
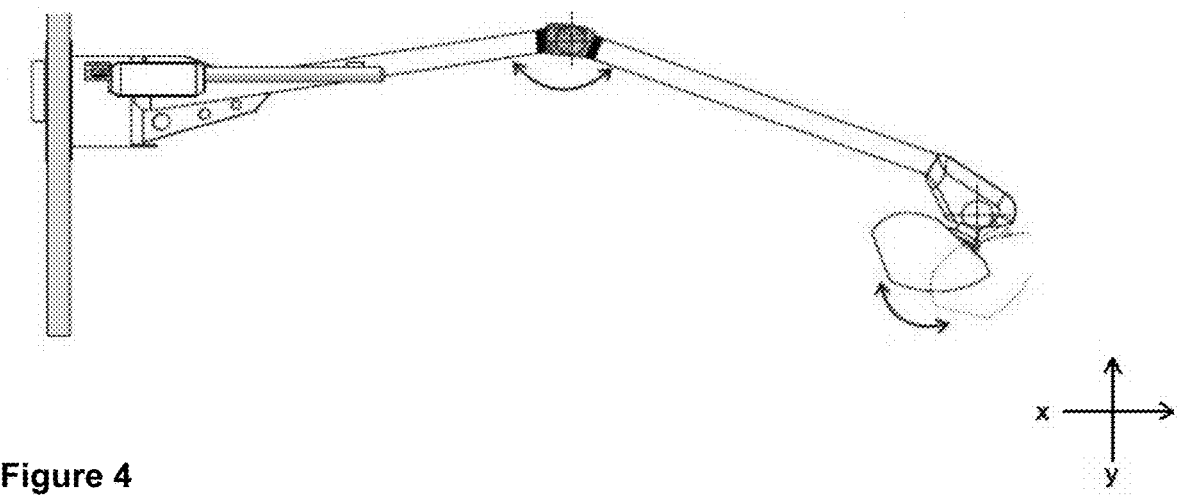
FIG. 4 shows the movement in the x, y plane of the robotic arm (2).

As shown in FIGS. 3 and 4, the robotic arm (2) comprises a first joint (8) and a second joint (9) that allow the movement of the robotic arm (2). The first joint (8), allows rotation in the radial direction around the y axis, from x to z, while the second joint (9) allows rotation in the radial direction around the z axis, from x to y, respectively.

The protective case (3) is characterized by being waterproof, resistant to extreme environmental factors and weatherproof.

The cooling system (20) comprises ventilation devices, an airflow duct (6) and an air inlet and/or outlet (6a) located at any point of the robotic arm (2). Ventilation devices are arranged inside the protective case (3), regulates the temperature and dissipates the excess heat from the image projector (18).

In one modality of the invention, the cooling system (20) is composed of thermoelectric cooling plates, heat sinks, air filters and dehumidifiers, in order to protect the projection unit from airborne particles, as well as humidity and temperature.

The image projection system is arranged inside the protective case (3) and reproduces the content indicated by the control system (10) at the preset frequency. The image projection system comprises an image projector (18) selected from, but not limited to, video projectors, Video Beam, slide projectors, photo projectors, laser devices, among others. The person normally skilled in the art will understand that the image projector (18) corresponds to any device that emits light and allows the visualization and projection of images.

In one modality of the invention, the image projection system has a sound module, selected from, but not limited to, an FM wave amplifier, which allows to play a sound by the human-machine interface of the user receiving the advertising message (24).

In one modality of the invention, the image projection system comprises an application for a smart phone that allows linking to the system and access to sound playing through the human-machine interface of the user receiving the advertising message (24).

The video cameras (19) capture the images of the environment, they can be located at any point of the mechanical structure (1) of the invention. Preferably, one of the cameras is in any position of the protective case (3) in order to capture the images being projected on the projection surface (25). The images captured by the video camera (19) are sent to the peripheral control module (14), which in turn are processed by the connectivity module (12) and can be observed by the user administrator through the human-machine interface of the administrator (22), in order to evidence the correct functioning of the device, the behavior or reaction of the users receiving the advertising message and the verification of the environment of the self-supporting system according to the invention, among others.

In one modality of the invention, the video cameras (19) are mobile, in order to allow to see both the projection of the system according to the invention and the environment.

The peripheral control module (14) comprises one or more micro controllers that control the projection process, execute the data processing method related to the activation or deactivation of the engines (17), of the cooling system (20), and the projector (18). In addition, the control module for peripherals (14) is composed of a variable speed drive (15), which receives the signal from the micro controller of the peripheral control module (14) and adjusts the speed given by the engine (17), for the opening or closing of the self-supporting system according to the invention.

The connectivity module (12) is composed of one or more micro controllers, which process the information submitted by the user administrator through the human-machine interface of the administrator (22), process and store the information generated in the sensors module (13), executes the data processing method according to the information received from the sensor module (13) and/or the administrator, sends the data on the sensors module (13) to the communications module (11) in order for this to send the respective reports to the administrator; and starts and/or turns off the micro controller of the peripheral control module (14).

The sensor module (13) comprises selected sensors from brightness sensors, electrical jitter sensors, turn sensors; relative humidity sensors, temperature sensors, precipitation sensors, wind sensors, atmospheric conditions sensors such as air quality sensors, including carbon dioxide sensors, among others and combinations thereof. The sensors module (13) takes data from the environment that influence the proper functioning of the self-supporting system according to the invention, as well as those that are interesting to the administrator or to the user receiving the advertising message. Where the sensors module (13) sends signals to the control module (11), specifically to the microcomputer (11a), where the decision is made, and control orders are sent to the peripherals module (14), who runs the order on any peripheral. Also, they allow the system to self-regulate and operate in an automated way by simplifying the administrator's work.

The communications module (11) is composed by a microcomputer (11a) and a communications submodule (11b). Where the microcomputer (11a) allows real-time communication between the self-supporting system according to the invention and the administrator, the communication between the self-supporting system according to the invention and the virtual platform through a server, the control of the system via the Internet, processing information generated by the sensors module (13), and the reading of limit switches (21), among other functions. And, where the communications submodule (11b) has been selected from a GSM-GPRS Wi-Fi module, among others, and combinations thereof and allows real-time communication of the self-supporting system according to the invention with the administrator user, as well as sending control commands and the receipt of data related to the status of the self-supporting system according to the invention through text messages (SMS) or through messages through a specific application connected to the Internet.

The human-machine interface of the administrator user (22) contain an information display means, which allows to report on the operation of the self-supporting system for mass communication and distribution of digital content and advertising according to the invention. In addition, the human-machine interface of the administrator (22) is composed by a means of income information, which allows the incorporation of instructions as the reproduction list of advertising content and the emission frequency thereof, the real-time modification of the playlist, switching on and off in real time, the requests to generate statistics regarding the information captured by the sensors and actuators. Additionally, the means of information display of this human-machine interface (22) allows the content visualization reproduced by the images projector (18), corresponding to the images captured by the video cameras (19); receives notifications from the control system (10) related to environmental conditions, with the operating status of the device (on/off), with the conditions of the projector (temperature, playback time) and the visualization of the statistics provided by the system and the reception of system failure alerts in real time, and remote and automated monitoring, among others.

In one modality of the invention, the human-machine administrator interface (22) is selected from servers, mobile devices, smartphones, tablets, computers or any equipment that allows the communication through the internet network, or through GSM, GPRS, Wi-Fi, among others, and combinations thereof.

In one modality of the invention, the human-machine interface of the administrator (22) includes a virtual platform that allows the administration, management and supervision through the network GSM, GPRS, Wi-Fi, among others and combinations thereof, self-supporting system for mass communication and distribution of content and digital advertising in public spaces according to the invention.

In one modality of the invention, the system is composed of a second type of human-machine interface of the administrator user containing an array of light indicators, where each of the sensors, each of the actuators and each of the components of the mechanical structure (1) has an associated indicator light, in order for the emitted signal to allow to identify the element of the self-supporting system for mass communication and distribution of content and digital advertising according to the invention that does not work properly. Where the second type of human-machine interface of the administrator user is selected from liquid screens, LCD screens, LED screens, among others. In one modality of the invention, the second type of human-machine interface of the administrator user has text and images.

The human-machine interface for the receiving user of the advertising message (24) has a means of entering information, which allows the interaction of the receiving user of the advertising message in real time with the self-supporting system for mass communication and distribution of content and digital advertising according to the invention, e.g. by requesting the transmission of a message. It also includes a means of displaying information, which allows reproducing information, such as advertising games, addressed by the self-supporting system for mass communication and distribution of content and digital advertising according to the invention.

In one modality of the invention, the human-machine interface of the receiving user of the advertising message (24) has a device for capturing the image which allows the user to interact with the self-supporting system for mass communication and distribution of content and digital advertising according to the invention, e.g. by reading codes, selected from, but not limited to, QR codes, bar codes, color combination codes, by executing advertising games, which allows the receiving user of the advertising message to interact with the system either through the execution of advertising games or by receiving information on demand. Additionally, the means of information display of this human-machine interface of the advertising message receptor (24) allows to display the content stored on said code and redirect the receiving user to the desired site by the advertiser.

The selected energy source is electrical energy, sources of alternative energy and combinations thereof. Where the source of energy contains one or more internal batteries that allow the storage and the system operation with an autonomy of at least seventy-two hours.

In one modality of the invention, the energy source is selected from one or more solar panels (27).

In another modality of the invention, the energy source is composed of both electric energy and solar energy.

Figure 6:
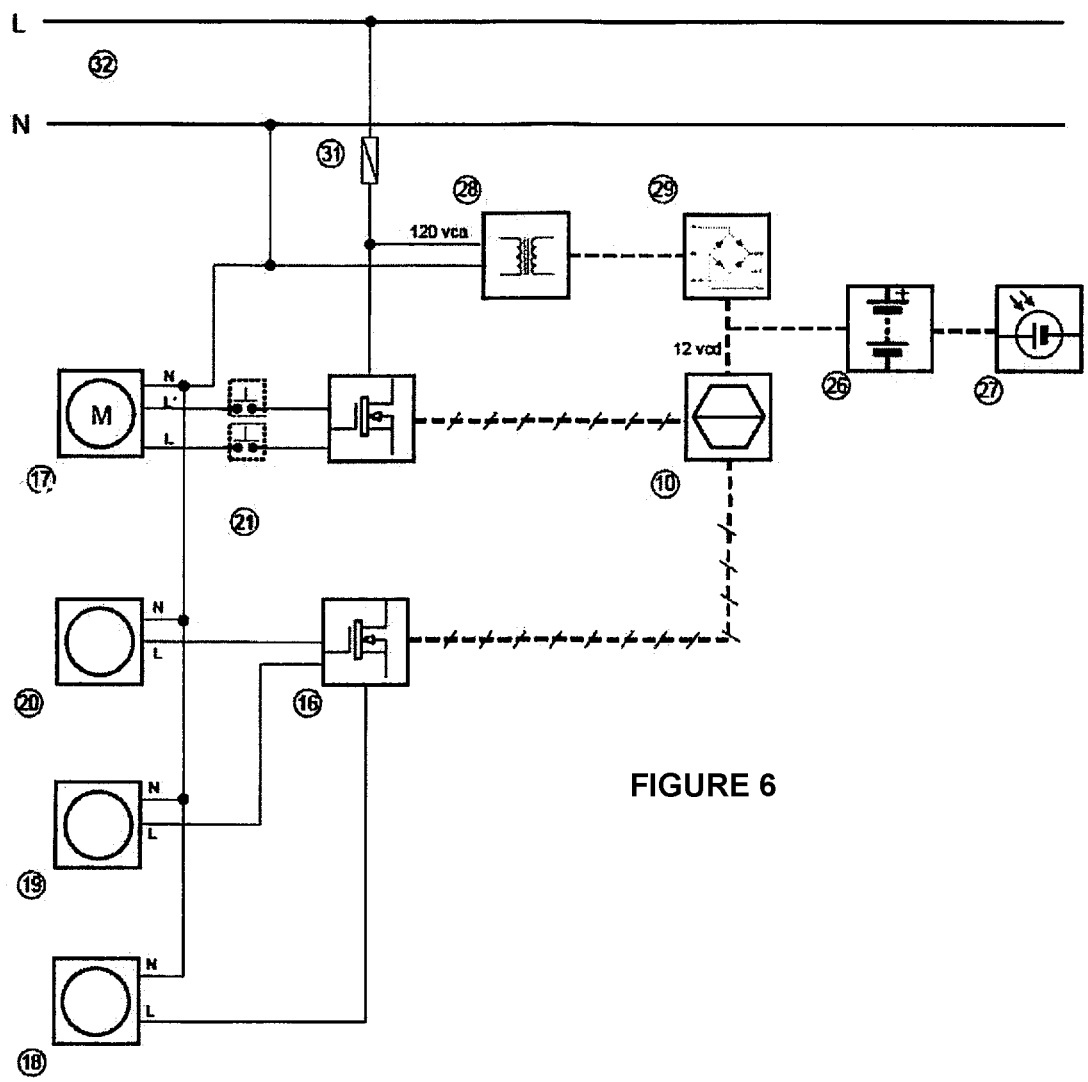
FIG. 6 shows the electrical diagram of the system for mass communication and distribution of content and digital advertising.

As illustrated in FIG. 6, the control system according to the invention can be energized with different energy sources. For example, one of them corresponds to solar energy. In this, the solar panel supplies power to a battery (26), which in turn energizes the control unit (10) that controls the power interface (16), where the latter provide power to the cooling system (23), to the video camera (19), to the image projector (18) and to the engine (17). The engine is protected by safety limit switches (30), to prevent damage to any of the system components.

When the system is powered by alternating electric power, coming from the electrical network (32), it supplies energy through a series of stages. The first stage of protection including a fuse (31), then a stage of regulation including a transformer (28) with a transformation ratio that allows to reduce the voltage of 120v AC to 12v AC, going through a rectification stage through a diodes rectifier bridge (29) needed to energize the control unit with 12v DC.

The system according to the invention has a low environmental impact from the energy point of view, since it efficiently uses the energy. Thus, the self-supporting system for mass communication and distribution of content and digital advertising in public spaces according to the invention operates with less than 20% of the energy required for the operation of a conventional LED screen on a surface of the same area.

In one modality of the invention, the self-supporting system for mass communication and distribution of content and digital advertising in public spaces includes a GPS module that allows for the geolocation of the device as well as the recipient users of the message that interact with the system, which is advantageous in marketing strategies and campaigns and advertisement at the time of compiling statistics.

Figure 5:
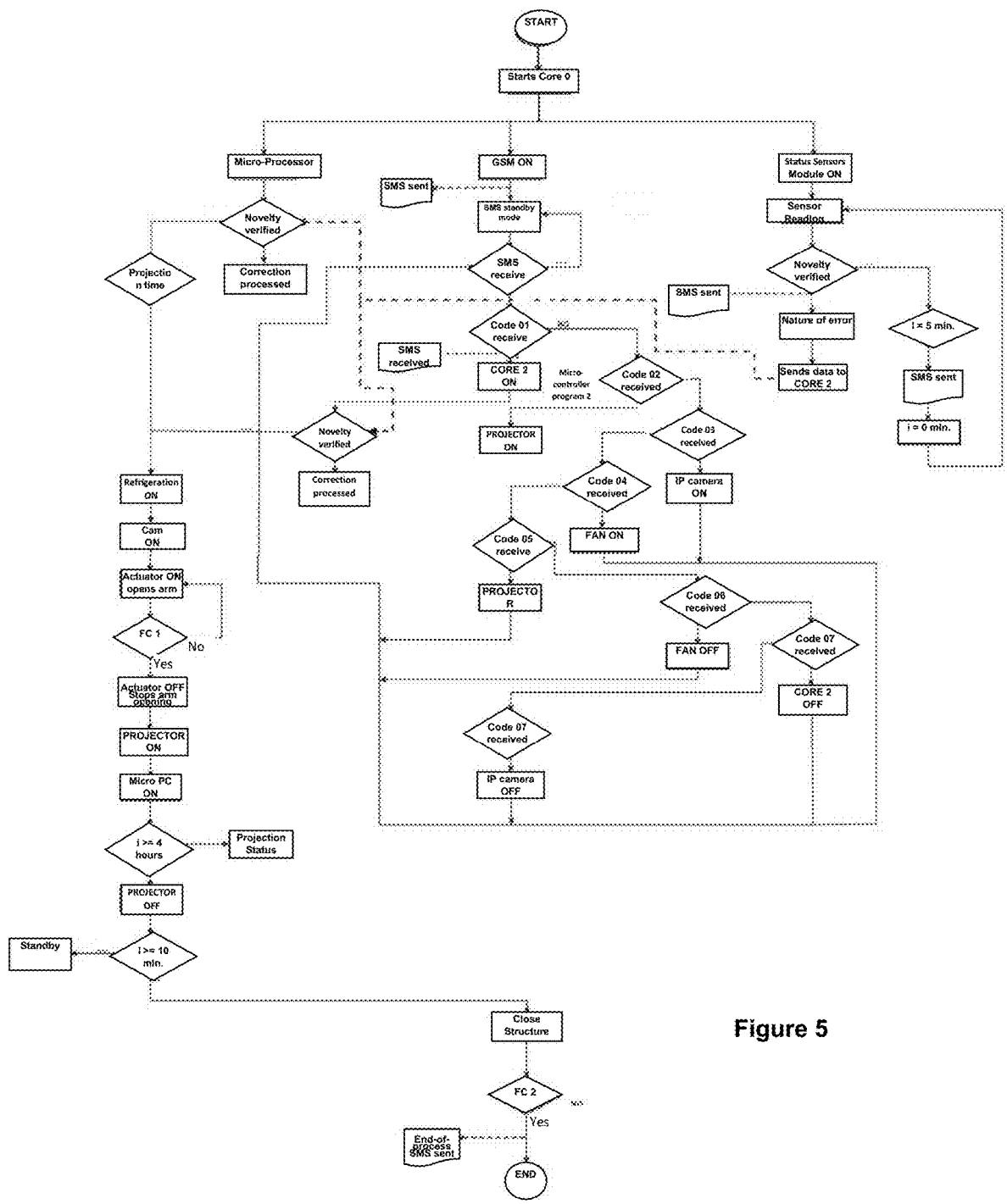
FIG. 5 shows the block diagram of the data processing method for the administration of the system for mass communication and distribution of content and digital advertising according to the invention.

In addition, the invention relates to a method of data processing for mass communication and distribution of content and digital advertising in public spaces that are composed by the following three stages simultaneously, as illustrated in FIG. 5;

the micro-controller is turned on;
the micro-controller energizes the micro-processor, the communications module (11) and the sensor module (13);
the sensors module (13) is composed by the next processing steps:
  any novelty with two options is verified:
    if a novelty is notified and the correction method is processed;
    if no novelty is notified[4], then the time module is entered by comparing the projection time stored in the system and comparing it with the current time. Starting the boot process, which has the following steps:
    Turning on the cooling (20) system; ignition of the camera (19) integrated to the system;
    Ignition of the actuator that controls the mechanism to allow the opening of the robotic arm (2);
    If the power-on confirmation of the limit switch (21) is negative, then said confirmation requests again information to the actuator that governs the mechanism to allow the opening of the robotic arm (2); but if the power-on confirmation of the limit switch (21) is affirmative, then the actuator shutdown signal is sent, stopping the actuator when it reaches the limit switch;
    Ignition of the projector (18);
    Ignition of the microcomputer;
    This microcomputer software is configured to store a time data that allows for a comparison of the projection time, that is, if said projection time data is lower than the set one, then the operation of the projector is still assumed, but if said projection time data is higher or equal to the set one, then starts the shutdown process of this projector (18);

Automatically, a new time counting starts, allowing to decide if the time stored data is less than the set one, then said projector (18) is on suspended state, but if the stored time is greater than the set one, then it is proceeded to de-energize the system, where said system protects the projection lamp;

Simultaneously to the process, another of the three stages begins, in the Global System module for Mobile Communications (GSM) that is formed by Ignition of the SIM 900 card and the microcomputer (11*a*);

Sending of information to the user, power on notification via SMS service or Internet;

Start SMS standby mode;

Accession to decision checking if said user does not receive an MSM, then it means that it continues on SMS standby mode, or if it is positively notified that the MSM is received;

Start of the decision to receive Code[5] 01. If received, the system receives an SMS with code 01 allowing the start of the data processing method and energizing the microcontroller; in which case, it is verified if there is any novelty. If any, a corrective procedure is performed; otherwise a message is sent to the user reporting normal operation. Now, if code 01 is not received, it can receive code 02. If code 02 is received, then the projector is turned on; otherwise, it is confirmed if code 03 is received. If code 03 is received, then the camera is switched on; otherwise, it is confirmed if code 04 is received. If code 04 is received, then it turns on the fan; otherwise, code 05 is allowed. If code 05 is received, then the projector is de-energized; otherwise, it can confirm receipt of code 06. If code 06 is received, then it is allowed to de-energize the fan; otherwise, it is confirmed if code 07 is received. If code 07 is received, then core 2 is de-energized; otherwise, it is confirmed if code 08 is received. If code 08 is received, then the camera is de-energized. Each of these final de-energization decisions returns to the initial block arranged to receive the first MSM message before attempting to receive code 0.

Simultaneously with the processes above, the third and last stage in the state sensors module is started, which comprises:

Reading of the sensors that act as peripheral:

The presence of a new novelty is verified. If said verification is affirmative, an SMS or message is sent via Internet to the user and the information of the novelty is sent to core 2, where the verification of the novelty is carried out again. If such verification yields an affirmative result, a corrective procedure is carried out; otherwise, a notification is sent to the user indicating the non-presence of novelty. If there is no novelty in the decision block, time counting starts and a poll is carried out at scheduled time points and a SMS is sent or a message via Internet notifying on non-novelties.

The figures presented in this description are merely for illustrative purposes of the invention. It is to be understood that the figures described do not limit the scope of the disclosed invention. A person skilled in art is capable of conceiving subsequent modifications to the principles determined in this document.

Although some modalities of the invention are described herein, it will be appreciated that numerous modifications and other modalities can be conceived by experts in the field after disclosing the present invention. For example, the features described herein can be applied in other modalities. Therefore, it is understood that the claims annexed are intended to cover all modifications and modalities within the spirit and scope of this description.

Glossary

[1]Administrator means the person in charge of programming, operation and remote monitoring in real time of the self-supporting system for mass communication and distribution of content and digital advertising in public spaces according to the invention.

[2]User receiving the advertising message means the person to whom the advertising message emitted by the self-supporting system for mass communication and distribution of content and digital advertising in public spaces is targeted.

[3]Advertising set means an interactive and real-time set for advertising purposes, where the attention of people is attracted and awards are given occasionally, where the award may be a discount or a bonus, for example.

[4]Novelty means any change in the parameters outside of those considered normal in the system, e.g. related to environmental conditions such as rain that prevents the operation of the system; failure in the energy supply; temperature increase above the risk limit; identified damage of the image projector (18), for example, when the light sensor does not identify lumens on the projection surface, among others.

[5]Code means an arbitrary command that determines the execution of a function; it works independently of the initial configuration, e.g., the camera can be turned on or off separately. It also allows for collection of information at any time, even if the system is not functioning as usual, that is, broadcasting advertising messages.

[6]Projection surface means the wall of the building where the self-supporting system is located for mass communication and distribution of content and digital advertising in public spaces according to the invention.

The invention claimed is:

1. A self-supporting system for mass communication and distribution of content and digital advertising in public spaces, comprising:
a mechanical structure comprising
a robotic arm that rotates radially around a y axis;
a protective box attached to a distal part of the robotic arm;
and a cooling system; wherein the cooling system comprises thermoelectric cooling plates, heat sinks, air filters, dehumidifiers, an air inlet on the robotic arm that provides air to the protective box and an airflow duct connected to the protective box that allows air flow from the air inlet through the protective box;
an image projector;
a video camera;
a control system, comprising a peripheral control module and a connectivity module;
a sensor module;
a communications module connects the system with a mobile telephone network and with an internet network; and an energy source; where the image projector projects images onto the building that supports the self-supporting system for mass communication and distribution of content and digital advertising in public spaces.

2. The self-supporting system for mass communication and distribution of content and digital advertising in public spaces of claim 1, further comprises one or more human-machine interface of a user receiving the advertising message.

3. The self-supporting system for mass communication and distribution of content and digital advertising in public spaces of claim 2, wherein the human-machine interface of the user receiving the advertising message comprises an image capture device.

4. The self-supporting system for mass communication and distribution of content and digital advertising in public spaces of claim 3, wherein the user receiving the advertising message activates QR codes, bar codes, color combination codes, that interact with the system either through the execution of advertising games or by receiving information on demand.

5. The self-supporting system for mass communication and distribution of content and digital advertising in public spaces of claim 2, wherein the human-machine interface of the user receiving the advertising message is selected from a server, mobile device, smartphone, tablet, or computer for direct and real-time interaction of the user receiving the advertising message with the system.

6. The self-supporting system for mass communication and distribution of content and digital advertising in public spaces of claim 1, wherein the communications module comprises a microcomputer and a communications submodule, providing bidirectional communication between an administrator user and the system in real time and between a user receiving the advertising message and the system in real time.

7. The self-supporting system for mass communication and distribution of content and digital advertising in public spaces of claim 6, wherein the communications submodule is selected from a GSM-GPRS module, WiFi, and combinations thereof.

8. The self-supporting system for mass communication and distribution of content and digital advertising in public spaces of claim 1, where a human-machine interface of an administrator user is selected from a server, mobile device, smartphone, tablet or computer; wherein the human-machine interface,
   presents content reproduced by the image projector, corresponding to images captured by the video camera;
   receives notifications from the control system related to:
      environmental conditions,
      operating status of the device,
      conditions of the projector, and
      visualization of the statistics provided by the system and reception of system failure alerts in real time; and
   performs remote and automated monitoring.

9. The self-supporting system for mass communication and distribution of content and digital advertising in public spaces of claim 8, where the human-machine interface of the administrator user comprises a virtual platform for administration, management and supervision through of the internet network, GSM, GPRS, Wi-Fi, and combinations thereof, of the self-supporting system for mass communication and distribution of content and digital advertising in public spaces and for remote administration of the system by the administrator user.

10. The self-supporting system for mass communication and distribution of content and digital advertising in public spaces of claim 1, comprising anchors, rear anchoring supports and fastening elements, which connect the mechanical structure to a roof covering or earthenware of a wall, ceiling or cantilever of a pre-existing structure or building.

11. The self-supporting system for mass communication and distribution of digital content and advertising in public spaces of claim 1, wherein the robotic arm comprises one or more joints.

12. The self-supporting system for mass communication and distribution of content and digital advertising in public spaces of claim 1, wherein the image projector comprises a sound module, selected from an FM wave amplifier, which plays sound through one or more human-machine interfaces of a user receiving an advertising message.

13. The self-supporting system for mass communication and distribution of content and digital advertising in public spaces of claim 1, wherein the peripheral control module comprises one or more micro-controllers and a variable speed drive.

14. The self-supporting system for mass communication and distribution of content and digital advertising in public spaces of claim 1, wherein the connectivity module comprises one or more micro-controllers providing bidirectional communication with users in real time.

15. The self-supporting system for mass communication and distribution of content and digital advertising in public spaces of claim 1, wherein the sensor module comprises selected sensors of brightness sensors, electrical fluctuation sensors, turn sensors; relative humidity sensors, temperature sensors, limit switches sensors, precipitation sensors, wind sensors, atmospheric conditions sensors, air quality sensors, and combinations thereof.

16. The self-supporting system for mass communication and distribution of content and digital advertising in public spaces of claim 1, where the energy source is selected from electrical energy, alternative energy sources and combinations thereof.

17. The self-supporting system for mass communication and distribution of content and digital advertising in public spaces of claim 1, which includes a GPS module, which incorporates geolocation as a tool in marketing and advertising campaigns.

18. A self-supporting system for mass communication and distribution of content and digital advertising in public spaces, comprising:
   a robotic arm that rotates radially around a y vertical axis on a horizontal plane;
   a protective box attached to a distal part of the robotic arm, comprising an image projector;
   an air inlet on the robotic arm that provides air to the protective box and an airflow duct connected to the protective box that allows air flow from the air inlet through the protective box;
   where the image projector projects images onto a building that supports the self-supporting system for mass communication and distribution of content and digital advertising in public spaces.

19. The self-supporting system for mass communication and distribution of content and digital advertising in public spaces of claim 18, wherein the robotic arm comprises one or more joints.

20. The self-supporting system for mass communication and distribution of content and digital advertising in public spaces of claim 18, wherein the communications module comprises a microcomputer and a communications submodule, providing bidirectional communication between an administrator user and the system in real time and between a user receiving the advertising message and the system in real time.

\* \* \* \* \*